United States Patent
Choi et al.

(10) Patent No.: US 12,449,152 B2
(45) Date of Patent: Oct. 21, 2025

(54) METHOD OF CONTROLLING AIR CONDITIONER THROUGH PROCESSING OF CLUSTERS OF INDOOR UNIT DATA

(71) Applicant: LG ELECTRONICS INC., Seoul (KR)

(72) Inventors: Changmin Choi, Seoul (KR); Soonyong Choi, Seoul (KR); Jinsik Kim, Seoul (KR); Hyuntak Lee, Seoul (KR); Seungjun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 482 days.

(21) Appl. No.: 17/958,587

(22) Filed: Oct. 3, 2022

(65) Prior Publication Data
US 2023/0116807 A1    Apr. 13, 2023

(30) Foreign Application Priority Data

Oct. 7, 2021    (KR) .................... 10-2021-0133408

(51) Int. Cl.
| | |
|---|---|
| *F24F 11/64* | (2018.01) |
| *F24F 11/77* | (2018.01) |
| *F24F 11/79* | (2018.01) |
| *F24F 110/10* | (2018.01) |
| *F24F 110/20* | (2018.01) |

(52) U.S. Cl.
CPC .............. *F24F 11/64* (2018.01); *F24F 11/77* (2018.01); *F24F 11/79* (2018.01); *F24F 2110/10* (2018.01); *F24F 2110/20* (2018.01)

(58) Field of Classification Search
CPC .. F24F 11/64; F24F 11/77; F24F 11/79; F24F 2110/10; F24F 2110/20; F24F 2110/30; F24F 2120/10; F24F 11/80; F24F 11/30; F24F 11/62; F24F 2120/20; F24F 11/46; Y02B 30/70; G06N 20/00; G05D 27/02; G01D 21/02
See application file for complete search history.

(56) References Cited

U.S. PATENT DOCUMENTS

| | | | |
|---|---|---|---|
| 2010/0241287 A1 | 9/2010 | Nishino et al. | |
| 2012/0023976 A1* | 2/2012 | Kim ...................... | F24F 11/30 62/89 |
| 2017/0046510 A1* | 2/2017 | Chen ................... | G06F 21/552 |
| 2017/0159953 A1* | 6/2017 | Kim ...................... | F24F 11/30 |

(Continued)

FOREIGN PATENT DOCUMENTS

| | | | | |
|---|---|---|---|---|
| CN | 106440235 A | * | 2/2017 | .......... F24F 11/0001 |
| CN | 107062532 A | * | 8/2017 | .............. F24F 11/30 |

(Continued)

OTHER PUBLICATIONS

European Search Report dated Feb. 15, 2023 issued in Application No. 22199975.8.

*Primary Examiner* — Alicia M. Choi
(74) *Attorney, Agent, or Firm* — KED & ASSOCIATES

(57) ABSTRACT

A method of controlling an air conditioner including collecting indoor unit data during a time period from when an indoor unit is ON to when the indoor unit is OFF, and correcting clusters based on changes in the clusters which are matched based on the collected data, thereby accurately determining a state of an indoor space by changing the plurality of clusters according to an environment on site.

19 Claims, 16 Drawing Sheets

(56) References Cited

U.S. PATENT DOCUMENTS

| | | | | |
|---|---|---|---|---|
| 2017/0211838 A1* | 7/2017 | Child | .................. | F24F 11/30 |
| 2017/0241659 A1* | 8/2017 | Choi | .................. | F24F 11/64 |
| 2020/0393158 A1 | 12/2020 | Burroughs et al. | | |
| 2021/0018211 A1* | 1/2021 | Ellis | .................. | F24F 11/72 |
| 2021/0049247 A1* | 2/2021 | Cristian | .................. | G06F 30/15 |
| 2021/0393834 A1* | 12/2021 | Wellig | .................. | F24F 11/63 |
| 2023/0312174 A1* | 10/2023 | Burroughs | .............. | F24F 11/65 |
| | | | | 156/64 |

FOREIGN PATENT DOCUMENTS

| | | | |
|---|---|---|---|
| JP | 2021082007 A | * | 5/2021 |
| KR | 10-1757446 | | 7/2017 |
| KR | 10-2077175 | | 2/2020 |
| KR | 10-2021-0078258 | | 6/2021 |
| KR | 20210078258 A | * | 6/2021 |

\* cited by examiner

FIG. 11

| CLUSTER LEVEL | INCREASE (SEVEN PERSONS OR MORE) | INCREASE (FOUR TO SIX PERSONS) | NORMAL (-3 TO +3 PERSONS) | DECREASE (-4 TO +6 PERSONS) | DECREASE (-7 PERSONS OR MORE) |
|---|---|---|---|---|---|
| Lv1 | A1 | A2 | A2 | A3 | A4 |
| Lv2 | A1 | A1 | A1 | A2 | A3 |
| Lv3 | A0 | A1 | A1 | A1 | A2 |
| Lv4 | A0 | A0 | A1 | A1 | A2 |
| Lv5 | A0 | A0 | A0 | A1 | A1 |

FIG. 14A

| CLUSTER LEVEL | INDOOR SPACE CONDITION | PRESENCE OF HUMAN BODY | VANE | INDOOR UNIT FAN | REMARK |
|---|---|---|---|---|---|
| Lv5 | VERY HOT AND HUMID VERY HIGH LOAD AND HUMIDITY HIGH SENSE OF DISCOMFORT | PRESENT | DIRECT AIR | STRONG AIR | |
| | | NONE | POWER COOLING | STRONG AIR | |
| Lv4 | VERY HOT AND DRY HIGH LOAD AND HIGH SENSE OF DISCOMFORT | PRESENT | INDIRECT AIR | MODERATE AIR | |
| | | NONE | AUTO SWING | MODERATE AIR | |
| Lv3 | SLIGHTLY HOT AND HUMID MODEST LOAD, BUT HIGH HUMIDITY LEADING TO DISCOMFORT | PRESENT | INDIRECT AIR | MODERATE AIR | PERFORM DEHUMIDIFYING OPERATION |
| | | NONE | INDIRECT AIR | MODERATE AIR | PERFORM DEHUMIDIFYING OPERATION |
| Lv2 | SLIGHTLY HOT AND DRY LOW LOAD AND DRY | PRESENT | INDIRECT AIR | WEAK AIR | |
| | | NONE | INDIRECT AIR | WEAK AIR | |
| Lv1 | COMFORT ZONE | PRESENT | INDIRECT AIR | WEAK AIR | REMAIN IN CURRENT STATE |
| | | NONE | INDIRECT AIR | WEAK AIR | REMAIN IN CURRENT STATE |

FIG. 14B

| CLUSTER LEVEL | INDOOR SPACE CONDITION | PRESENCE OF HUMAN BODY | VANE | INDOOR UNIT FAN | REMARK |
|---|---|---|---|---|---|
| Lv5 | VERY COLD AND DRY<br>VERY HIGH LOAD AND<br>VERY LOW HUMIDITY<br>IMPOSSIBLE TO CONTROL HUMIDITY | PRESENT | DIRECT AIR | DIRECT AIR | INFORMING NEED FOR HUMIDIFICATION |
| | | NONE | AUTO ADJUSTING AIR | DIRECT AIR | INFORMING NEED FOR HUMIDIFICATION |
| Lv4 | VERY COLD AND HUMID<br>LOAD LEADING TO FEELING COLD<br>DIFFICULT TO CONTROL INITIAL HUMIDITY | PRESENT | DIRECT AIR | MODERATE AIR | INFORMING NEED FOR HUMIDIFICATION, IF NECESSARY |
| | | NONE | AUTO ADJUSTING AIR | MODERATE AIR | |
| Lv3 | SLIGHTLY COLD AND DRY<br>MODEST LOAD, BUT LOW HUMIDITY<br>LEADING TO FEELING COLD | PRESENT | DIRECT AIR | MODERATE AIR | INFORMING NEED FOR HUMIDIFICATION |
| | | NONE | AUTO ADJUSTING AIR | MODERATE AIR | INFORMING NEED FOR HUMIDIFICATION |
| Lv2 | SLIGHTLY HOT AND DRY<br>LOW LOAD AND DRY | PRESENT | DIRECT AIR | WEAK AIR | |
| | | NONE | AUTO ADJUSTING AIR | WEAK AIR | |
| Lv1 | NORMAL | PRESENT | DIRECT AIR | WEAK AIR | |
| | | NONE | AUTO ADJUSTING AIR | WEAK AIR | INDIRECT AIR IN THE ABSENCE OF FLOOR SENSOR |

FIG. 16

| humi | set temp | pmv |
|------|----------|--------|
| 30 | 26 | 0.035 |
| 31 | 26 | 0.043 |
| 32 | 26 | 0.051 |
| 33 | 26 | 0.059 |
| 34 | 26 | 0.067 |
| 35 | 26 | 0.075 |
| 36 | 26 | 0.083 |
| 37 | 26 | 0.091 |
| 38 | 26 | 0.099 |
| 39 | 25.5 | −0.056 |
| 40 | 25.5 | −0.048 |
| 41 | 25.5 | −0.041 |
| 42 | 25.5 | −0.033 |
| 43 | 25.5 | −0.025 |
| 44 | 25.5 | −0.017 |
| 45 | 25.5 | −0.009 |
| 46 | 25.5 | −0.001 |
| 47 | 25.5 | 0.007 |
| 48 | 25.5 | 0.015 |
| 49 | 25.5 | 0.022 |
| 50 | 25.5 | 0.030 |
| 51 | 25.5 | 0.038 |
| 52 | 25.5 | 0.046 |
| 53 | 25.5 | 0.054 |
| 54 | 25.5 | 0.062 |
| 55 | 25.5 | 0.070 |
| 56 | 25.5 | 0.078 |
| 57 | 25.5 | 0.085 |
| 58 | 25.5 | 0.093 |
| 59 | 25 | −0.065 |
| 60 | 25 | −0.058 |
| 61 | 25 | −0.050 |
| 62 | 25 | −0.043 |
| 63 | 25 | −0.035 |
| 64 | 25 | −0.027 |
| 65 | 25 | −0.020 |
| 66 | 25 | −0.012 |
| 67 | 25 | −0.004 |
| 68 | 25 | 0.003 |
| 69 | 25 | 0.011 |
| 70 | 25 | 0.019 |
| 71 | 25 | 0.026 |
| 72 | 25 | 0.034 |
| 73 | 25 | 0.041 |
| 74 | 25 | 0.049 |
| 75 | 25 | 0.057 |
| 76 | 25 | 0.064 |
| 77 | 25 | 0.072 |
| 78 | 25 | 0.080 |
| 79 | 25 | 0.087 |
| 80 | 25 | 0.095 |
| 81 | 24.5 | −0.069 |
| 82 | 24.5 | −0.062 |
| 83 | 24.5 | −0.054 |
| 84 | 24.5 | −0.047 |
| 85 | 24.5 | −0.040 |
| 86 | 24.5 | −0.032 |
| 87 | 24.5 | −0.025 |
| 88 | 24.5 | −0.017 |
| 89 | 24.5 | −0.010 |
| 90 | 24.5 | −0.002 |

METHOD OF CONTROLLING AIR CONDITIONER THROUGH PROCESSING OF CLUSTERS OF INDOOR UNIT DATA

CROSS-REFERENCE TO RELATED APPLICATION(S)

This application claims priority under 35 U.S.C. § 119 to Korean Application No. 10-2021-0133408, filed in Korea on Oct. 7, 2021, whose entire disclosure(s) is/are hereby incorporated by reference.

BACKGROUND

1. Field

The present disclosure relates to a method of controlling an air conditioner, and more particularly to a method of controlling an air conditioner capable of identifying a state of an indoor space and controlling an operation based on the state.

2. Background

As people spend more time in indoor spaces, such as residential spaces or office spaces, there is a growing demand for improved comfort in the indoor spaces. The comfort of the indoor space may be improved by supplying heat-exchanged air or purified air to the space using an indoor unit installed in the indoor space.

An air conditioner may increase the comfort of the indoor space by supplying cooled air to the indoor space when the temperature of the indoor space is high, and by supplying heated air to the indoor space when the temperature of the indoor space is low.

An existing air conditioner performs follow-up control based on temperature and direction and speed of air which are input by a user, causing a problem in that the existing air conditioner may not satisfy the occupant comfort according to a state of the indoor space or may not rapidly change the indoor space into a comfortable state.

In addition, the existing air conditioner may not reflect a change in state of the indoor space or the indoor unit, leading to a relatively shorter period of time during which the indoor space is maintained in a comfortable state.

Further, in an air conditioner including a plurality of indoor units, all the plurality of indoor units may be difficult to rapidly maintain comfort, and the indoor units may not be controlled individually.

Korean Patent No. 10-2077175 discloses a method of controlling an air conditioner by mapping the air conditioner to one of a plurality of groups based on received operating information and by using a cooling capacity prediction model corresponding to the mapped group.

However, in the related art, individual air conditioners are mapped to one of the plurality of groups, such that only average characteristics of the matched group remain without characteristics of the individual air conditioners, and all the indoor units are controlled based on the cooling capacity corresponding to a mean value of the matched group, thereby causing inconvenience to users.

In addition, a model stored in the server is used, such that when connection to the server is terminated due to external or internal factors, there is a risk in that the air conditioner may not perform group mapping and prediction.

Korean Patent No. KR10-1757446 discloses a method of controlling an air conditioner based on measured environmental element values, heat index, thermal comfort index, and training data.

However, the related art has a problem in that the air conditioner performs a control command, input by a user, after the user already feels discomfort, such that it is difficult to perform a controlling operation rapidly and accurately in consideration of a user's state or a state of the indoor space.

BRIEF DESCRIPTION OF THE DRAWINGS

Embodiments will be described in detail with reference to the following drawings in which like reference numerals refer to like elements, and wherein:

FIG. 11 is a diagram illustrating data for explaining a change in a degree of overheat based on a change in the number of persons;

FIG. 14A is a diagram illustrating airflow classification data, and data for explaining a method of controlling an airflow based on cluster levels in a cooling mode, according to an embodiment of the present disclosure;

FIG. 14B is a diagram illustrating airflow classification data, and data for explaining a method of controlling an airflow based on cluster levels in a heating mode, according to an embodiment of the present disclosure;

FIG. 16 is a diagram illustrating data for explaining predicted mean vote data in a cooling mode, according to an embodiment of the present disclosure.

DETAILED DESCRIPTION

Figure 1:
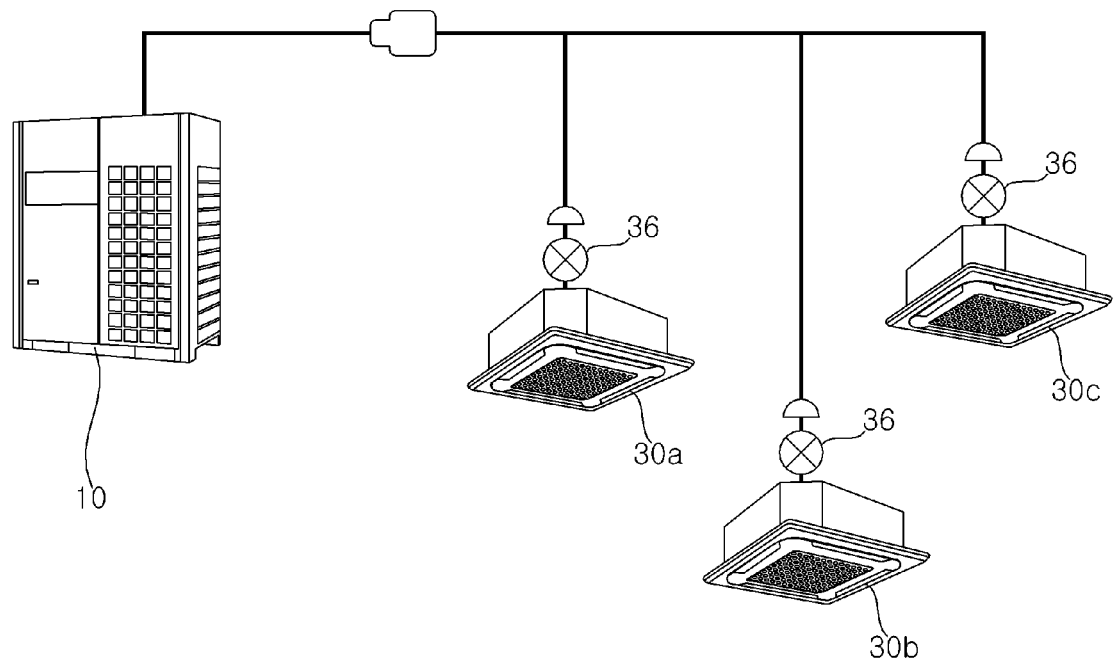
FIG. 1 is a schematic diagram illustrating an air conditioner including an outdoor unit and a plurality of indoor units according to an embodiment of the present disclosure.

Advantages and features of the present disclosure and methods of accomplishing the same will be more clearly understood from exemplary embodiments described below with reference to the accompanying drawings. However, the present disclosure is not limited to the following embodiments but may be implemented in various different forms. The embodiments are provided only to complete disclosure of the present disclosure and to fully provide a person having ordinary skill in the art to which the present disclosure pertains with the category of the present disclosure, and the present disclosure will be defined by the scope of the appended claims. Wherever possible, like reference numerals generally denote like elements through the specification.

Hereinafter, embodiments of the present disclosure will be described in detail with reference to the accompanying drawings for description of a method of controlling an air conditioner.

<Configuration>

Figure 2:
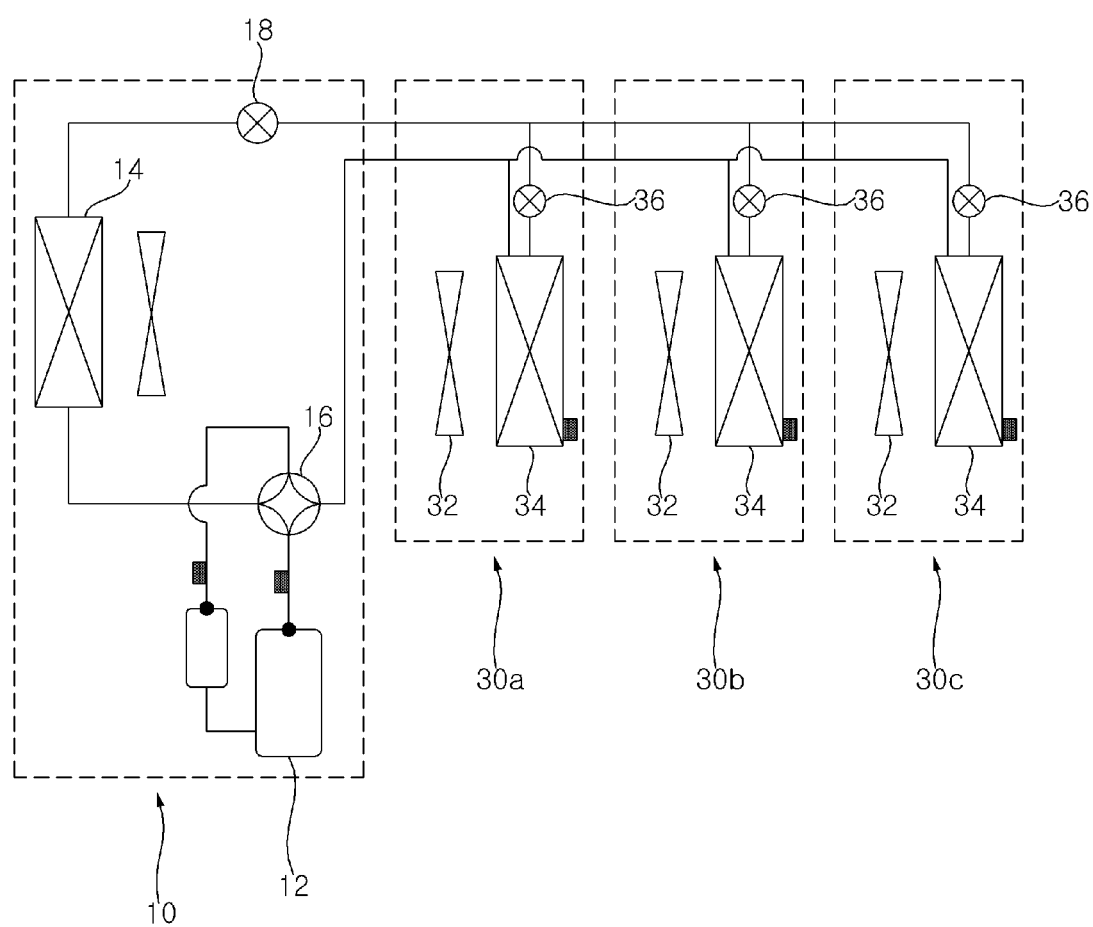
FIG. 2 is a schematic diagram illustrating a system to which an outdoor unit and a plurality of indoor units are connected, according to an embodiment of the present disclosure.

Referring to FIGS. 1 and 2, an air conditioner of the present disclosure may include an outdoor unit 10 and a plurality of indoor units 30a, 30b, and 30c connected to the outdoor unit 10.

Referring to FIG. 2, the outdoor unit 10 may include: a compressor 12 for compressing a refrigerant; an outdoor heat exchanger 14 for heat exchange between a refrigerant, discharged from the compressor 12, and outside air; a switching valve 16 for controlling the refrigerant discharged from the compressor 12 to flow to the outdoor heat exchanger 14 or the indoor units; and an outdoor expansion valve 18 for expanding the refrigerant flowing to the outdoor heat exchanger 14.

Referring to FIG. 2, the respective indoor units 30a, 30b, and 30c may include: an indoor unit fan 32 generating an air flow into an indoor space; an indoor heat exchanger 34 for heat exchange between indoor air and the refrigerant; and an indoor expansion valve 36 for controlling an amount of the refrigerant flowing to the indoor heat exchanger 34 or expanding the refrigerant.

Figure 3:
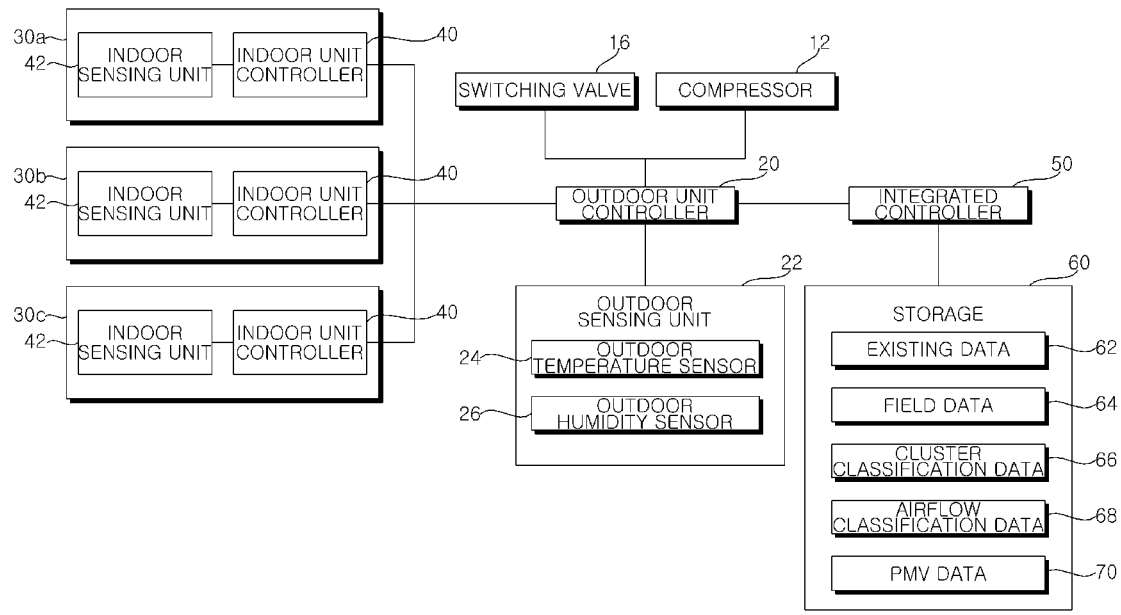
FIG. 3 is a block diagram illustrating components related to an integrated controller, an outdoor unit controller, and an indoor unit controller according to an embodiment of the present disclosure.

Referring to FIG. 3, the air conditioner may include: an integrated controller 50 for clustering an indoor space, in which the respective indoor units are installed, by considering conditions of an outdoor environment and an indoor environment and the like; an outdoor unit controller 20 connected to the integrated controller 50 and controlling the operation of the compressor 12 installed in the outdoor unit 10; and an indoor unit controller 40 connected to the outdoor unit controller 20 and sensing the indoor environment or controlling the operation of the indoor unit fan 32 and vanes 38.

The indoor unit fan 32 may control a volume of air flowing to an outlet (not shown) of the indoor unit, and the vanes 38 may control a direction of the air flowing to the outlet.

The integrated controller 50 may cluster the indoor space into a plurality of clusters based on indoor environment information stored in a storage 60. Here, the plurality of clusters may refer to groups classified according to the temperature, humidity, and set temperature of the indoor space, and an indoor temperature difference.

The integrated controller 50 may match the indoor space, in which the indoor units are installed, to one of the plurality of clusters based on existing data 62 stored in the storage 60 and field data 64 measured by an outdoor sensing unit 42 and an indoor sensing unit 42 and stored in the storage 60.

The integrated controller 50 may transmit cluster matching information for each of a plurality of indoor spaces, in which the plurality of indoor units 30a, 30b, and 30c are installed, to the indoor unit controller 40 through the outdoor unit controller 20. The indoor unit controller 40 may control the operation of the indoor unit fan 32 and the vanes 38 based on the cluster information of the indoor spaces transmitted from the integrated controller 50. The indoor unit controller 40 may transmit information, sensed by the indoor sensing unit 42, to the integrated controller 50 through the outdoor unit controller 20.

The integrated controller 50 may sense a total load of the plurality of indoor units 30a, 30b, and 30c and may transmit the sensed load to the outdoor unit controller 20. The sensing of the total load of the plurality of indoor units 30a, 30b, and 30c may be determined based on the clusters of the indoor environment in which the respective indoor units 30a, 30b, and 30c are installed.

The outdoor unit controller 20 may control the operation of the compressor 12 based on the total load of the plurality of indoor units 30a, 30b, and 30c, which is received from the integrated controller 50. The outdoor unit controller 20 may transmit the information, sensed by the outdoor sensing unit 22, to the integrated controller 50.

The outdoor unit controller 20 may control the compressor 12 to control a flow of refrigerant flowing to the respective indoor units 30a, 30b, and 30c. The outdoor unit controller 20 may receive information on the total load of the plurality of indoor units 30a, 30b, and 30c from the integrated controller 50, and may control the operation of the compressor 12.

Unlike the example of FIG. 3, the outdoor unit controller 20 may also be included in the integrated controller 50. Accordingly, the integrated controller 50 may directly operate or drive the compressor 12 and may receive data sensed by the outdoor sensing unit 22.

The outdoor sensing unit 22 may include an outdoor temperature sensor 24 for sensing the temperature of an outdoor space and an outdoor humidity sensor 26 for sensing the humidity of the outdoor space.

Figure 4:
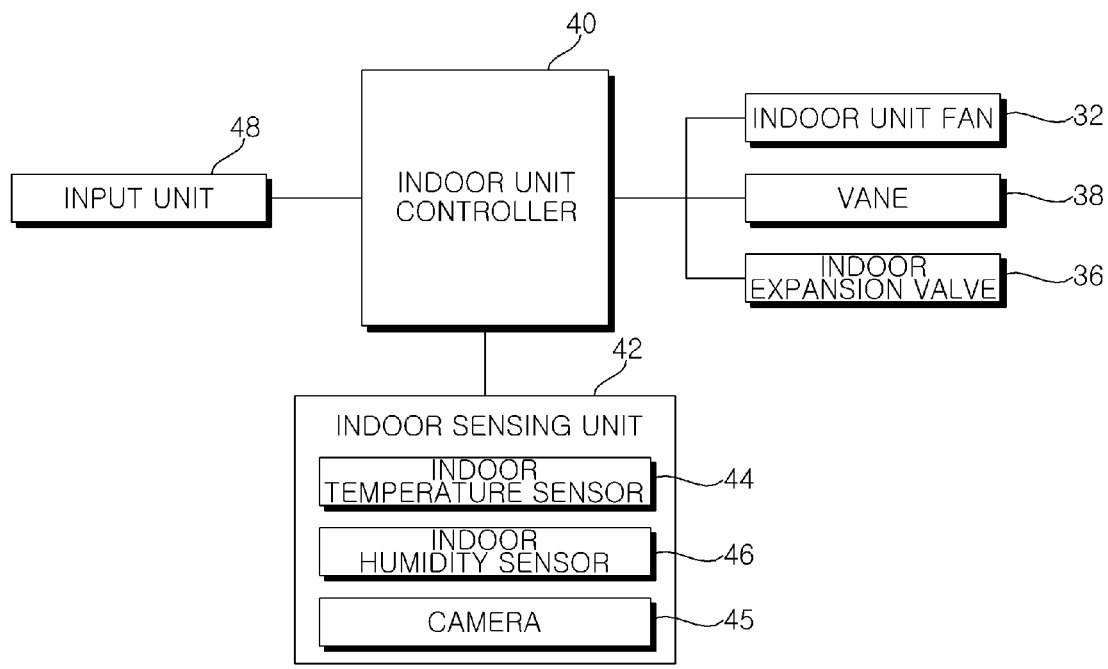
FIG. 4 is a block diagram illustrating components related to an indoor unit controller according to an embodiment of the present disclosure.

Referring to FIG. 4, the indoor sensing unit 42 may include an indoor temperature sensor 44 for sensing the temperature of an indoor space and an indoor humidity sensor 46 for sensing the humidity of the indoor space. The temperature and humidity sensed by the indoor sensing unit 42 may be transmitted to the integrated controller 50 through the indoor unit controller 40. Referring to FIG. 4, the indoor sensing unit 42 may include a camera 45 for sensing occupants present in the indoor space. The number of occupants or a change in the number of occupants may be sensed by the camera 45.

Referring to FIG. 4, the air conditioner may include the indoor unit controller 40 for controlling the indoor unit fan 32 and vanes based on the temperature and humidity of the indoor space or set temperature input by a user.

The indoor unit controller 40 may control a rotational speed of the indoor unit fan 32. By controlling the indoor unit fan 32, the controller 40 may control the volume of air discharged through the outlet.

The indoor unit controller 40 may change an arrangement of the vanes 38. By controlling the arrangement of the vanes 38, the indoor unit controller 40 may control a direction of air discharged through the outlet.

The indoor unit controller 40 may control the indoor expansion valve 36. By controlling the indoor expansion valve 36, the indoor unit controller 40 may control an amount of refrigerant flowing to the indoor units.

The indoor unit controller 40 may transmit the temperature or humidity, sensed by the indoor sensing unit 42, or the set temperature input by a user through an input unit 48, to the integrated controller 50 through the outdoor unit controller 20.

The integrated controller 50 may match the indoor space, in which the indoor units are installed, to one of the plurality of clusters based on field data transmitted from the indoor unit controller 40. The indoor unit controller 40 may control the rotational speed of the indoor unit fan 32 for controlling the volume and speed of air discharged through the outlet. The indoor unit controller 40 may control the arrangement of the vanes 38 for controlling the direction of air discharged through the outlet. The indoor unit controller 40 may control the indoor expansion valve 36 for controlling an amount of refrigerant flowing to the indoor units among the refrigerants flowing from the outdoor unit 10.

Referring to FIG. 3, the storage 60 may include the existing data 62 measured at a plurality of installation sites, the field data 65 measured at sites where the current indoor and outdoor units are installed, and cluster classification data 66 measured by clustering the indoor environment into a plurality of clusters of based on the existing data 62 and the field data 64. If there is no field data 64, the cluster classification data 66 may be measured by clustering the indoor environment into the plurality of clusters based on only the existing data 62. The storage 60 may include airflow classification data 68 in which airflows are classified according to the direction or volume of air discharged through the outlet of the indoor units. The storage 60 may include predicted mean vote (PMV) data 70. The PMV is a heat balance equation between the human body and its surrounding environment, and is calculated by measuring six thermal environment factors (air temperature, air humidity, air velocity, mean radiant temperature (MRT), metabolic rate, and clothing insulation), and may be data using seven scales ranging from −3 to +3 to measure the degree of hotness or coldness.

The American Society of Heating, Refrigerating and Air-Conditioning Engineers (ASHRAE) standard may be used as the PMV data 70.

Figure 5:
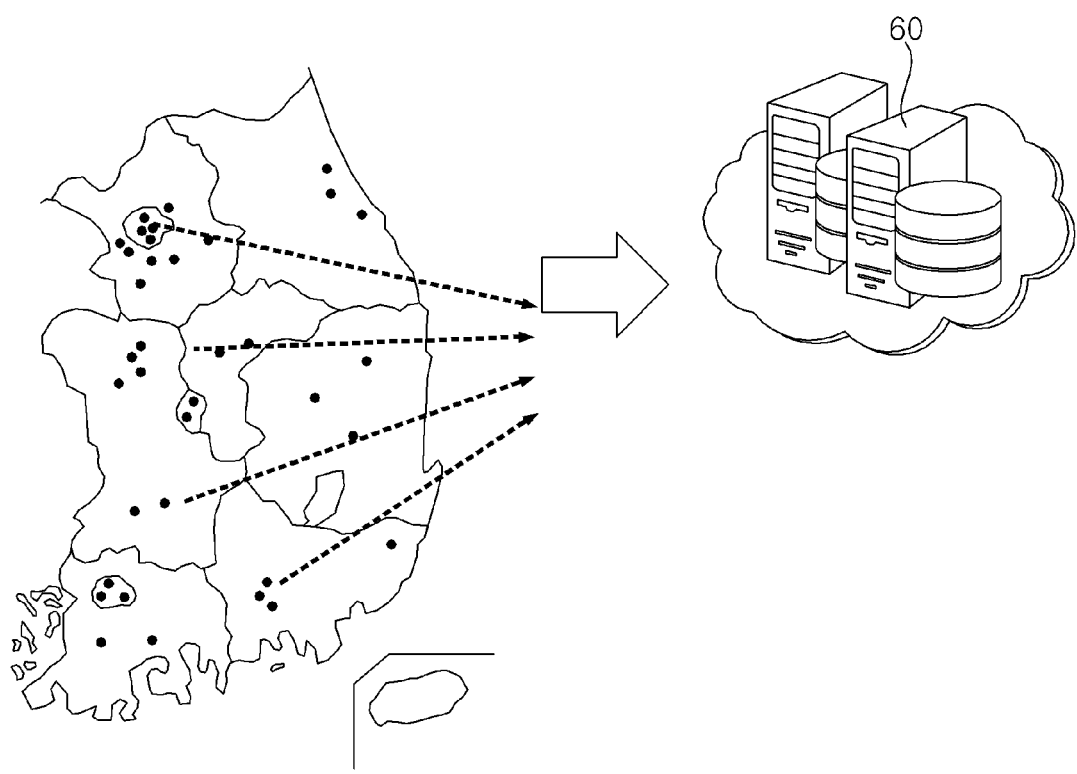
FIG. 5 is a diagram explaining existing data collected in a plurality of environments and stored in a storage.

Referring to FIG. 5, the existing data 62 may include indoor temperature, indoor humidity, outdoor temperature, and outdoor humidity, which are measured or input by the air conditioners installed in a plurality of spaces and set temperature data input by a user. The field data 64 may include indoor temperature, indoor humidity, outdoor temperature, and outdoor humidity, which are measured or input by the currently installed air conditioners, and set temperature input by the user.

Figure 6:
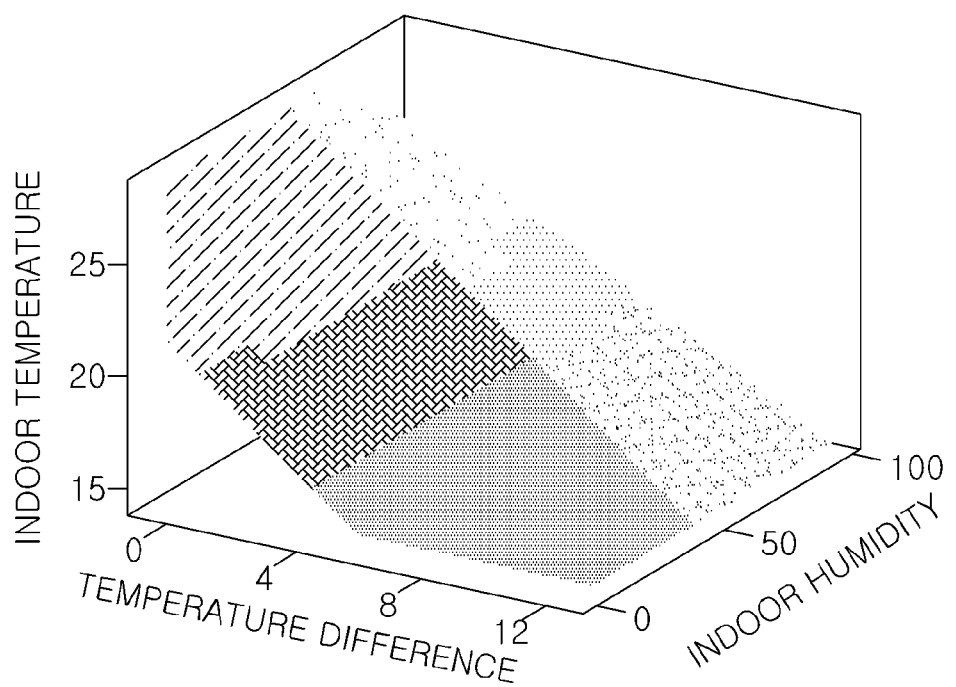
FIG. 6 is a diagram illustrating data obtained by clustering existing data, collected in a plurality of environments, based on indoor temperature, indoor humidity, and a difference between the indoor temperature and set temperature.

Referring to FIG. 6, the integrated controller 50 may cluster the indoor environment into the plurality of clusters by classifying a plurality of environment data stored in the storage 60 based on the indoor humidity, indoor temperature, and a difference between the set temperature and the indoor temperature. The integrated controller 50 may cluster the indoor environment into a plurality of clusters based on a difference value between the set temperature and the indoor temperature. The collected existing data may have a high percentage of data that converge on the set temperature, such that the indoor environment may be clustered by sampling data of each state of the indoor space.

If there is no indoor humidity data among the plurality of environment data, the indoor humidity may be estimated based on the indoor temperature and an absolute outdoor humidity value.

The indoor environment may be clustered into six clusters by using the indoor temperature, the indoor humidity, and the difference between the indoor temperature and the set temperature as input values. Six regions may be clustered by the indoor units based on a sensible heat load and a latent heat load.

That is, the indoor environment may be clustered based on a space in which the sensible heat load and the latent heat load are properly handled, a space in which only some of the sensible heat load and the latent heat load are handled, a space in which the sensible heat load and the latent heat load remain to be handled, and the like.

A method of clustering the indoor environment may be performed by clustering data having similar characteristics. That is, the method may refer to a learning method of clustering data having a similar load range required for the indoor units, based on similar temperature and humidity or a difference between the indoor temperature and the set temperature. An unsupervised learning method may be used as the method of segmenting the indoor environment, which is generally performed by clustering unlabeled data.

The method of clustering the indoor environment may include clustering using the K-Means algorithm, in which given data is divided into partitions. In the clustering using the K-Means algorithm, by using n number of centroids and data points and finding a position of a centroid n, at which the sum of distances between the centroids and the data points is minimized, points adjacent to the centroid are clustered based on the centroid.

Figure 7A:
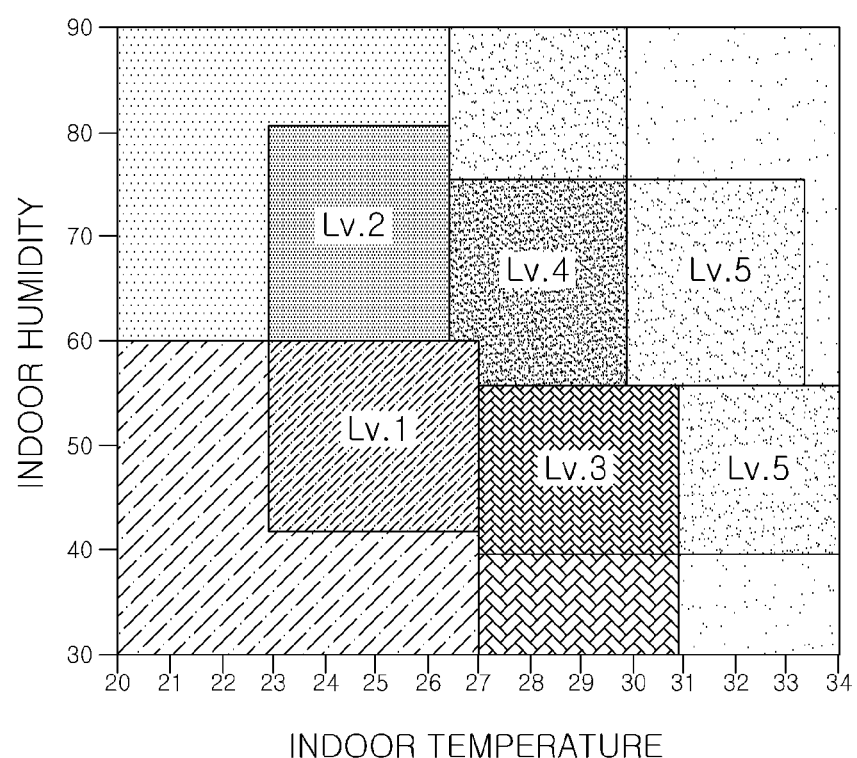
FIG. 7A is a diagram illustrating data classified into a plurality of clusters based on indoor temperature and indoor humidity in a cooling mode.
Figure 7B:
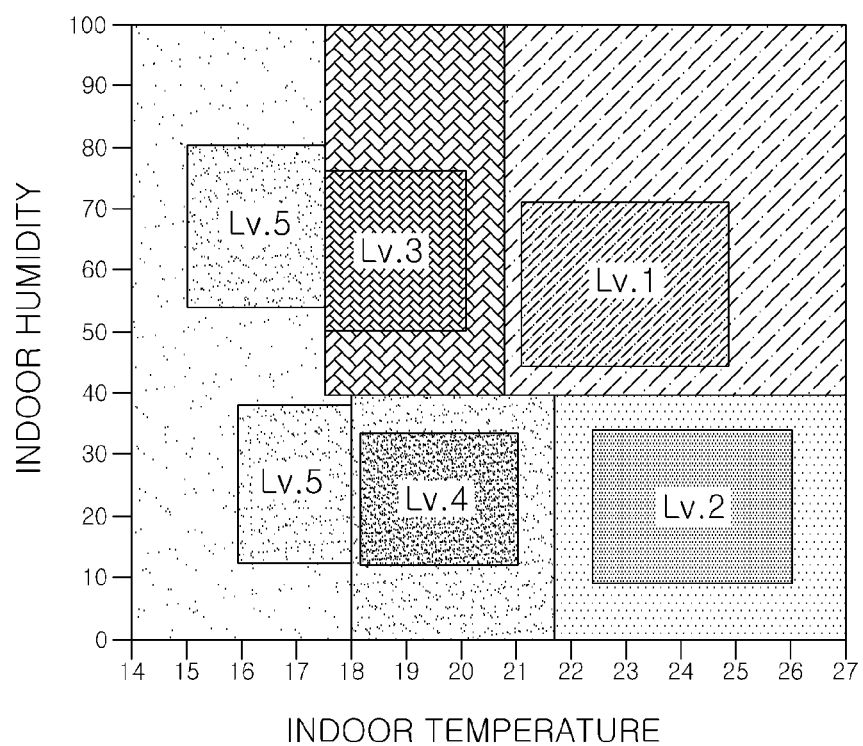
FIG. 7B is a diagram illustrating data classified into a plurality of clusters based on indoor temperature and indoor humidity in a heating mode.

Referring to FIGS. 7A and 7B, the indoor environment may be clustered into a first cluster level (LV1) at which both the sensible heat load and the latent heat load are handled properly, a second cluster level (LV2) at which the sensible heat load is handled properly but the latent heat load remains to be handled, a third cluster level (LV3) at which the latent heat load is handled properly but the sensible heat load remains to be handled, a fourth cluster level (LV4) at which both the sensible heat load and the latent heat load remain to be handled, and a fifth cluster level (LV5) at which a heavy load remains to be handled.

Referring to FIG. 7A, as the cluster level increases, a degree of discomfort felt by a user in the indoor space may increase. In addition, referring to FIG. 7A, the first cluster level LV1 and the second cluster level LV2, at which the indoor temperature is set to a level lower than the set temperature, may be a range in which a user may feel less discomfort compared to the third cluster level LV3 or the fifth cluster level LV5.

The cluster levels may be classified such that as the cluster level increases, a heavier load may be required. However, this is merely an example, and the cluster levels may be classified such that as the cluster level decreases, a heavier load may be required.

FIG. 7A is an example of classifying an indoor environment in a cooling mode, and FIG. 7B is an example of classifying the indoor environment in a heating mode. In the heating mode as illustrated in FIG. 7B, as the cluster level increases, a degree of discomfort felt by a user may increase. In FIG. 7B, the first cluster level LV1 and the second cluster level LV2, at which the indoor temperature is set to a level greater than or equal to the set temperature, may be a range in which a user may feel less discomfort compared to the third cluster level LV3 to the fifth cluster level LV5.

The cluster classification data 66 for classifying the indoor space into a plurality of clusters, as illustrated in FIGS. 7A and 7B, may be stored in the storage 60.

The integrated controller 50 may match the indoor space to one of the plurality of clusters based on the outdoor temperature and outdoor humidity which are sensed by the outdoor sensing unit 22, the indoor temperature and indoor humidity which are sensed by the plurality of indoor sensing units 42, and the set temperature input by a user through the input unit 48.

<Cluster Correction>

Hereinafter, an example of correcting clusters based on the operation of the indoor units and changes in the clusters will be described with reference to FIGS. 8 and 9.

The indoor units are ON (S100), and indoor unit data are collected (S110).

The indoor units may be operated by a user's input. As the indoor units are ON, the compressor 12 of the indoor unit 10 may be operated. When the compressor 12 is in operation, a refrigerant may be supplied into the indoor units by the indoor expansion valve 36. Accordingly, when the indoor units are in operation, the indoor unit fan 32 is ON, and the refrigerant flows into the indoor units by the indoor expansion valve 36.

The indoor unit data may include data sensed or input by the indoor sensing unit 42 or the input unit 48.

The operation (S110) of collecting the indoor unit data may refer to transmitting temperature and humidity information of the indoor space, which is sensed by the indoor temperature sensor 44 and the indoor humidity sensor 46, to the integrated controller 50. The indoor unit controller 40 may transmit the temperature and humidity information of the indoor space to the integrated controller 50 through the outdoor unit controller 20.

The operation (S110) of collecting the indoor unit data may include transmitting the set temperature information, input by a user, to the integrated controller 50.

The set temperature may be input by a user to the input unit 48. However, if the set temperature is not input by the user, a previous set temperature input to the input unit 48 may be used as the input set temperature.

The integrated controller 50 may perform an operation (S120) of matching the indoor space to one of the plurality of clusters based on the indoor unit data.

The operation (S120) of matching the indoor space to one of the plurality of clusters may be performed by preprocessing the collected indoor unit data.

If there is no indoor humidity sensor 46 in the process of preprocessing the indoor unit data, the indoor humidity may be estimated based on temperature and humidity information sensed by the outdoor temperature sensor 24 and the outdoor humidity sensor 26, and temperature information of the indoor space.

By preprocessing the collected indoor unit data, calculated degrees of influence between the collected data factors may be adjusted to a similar level.

There may be a difference in scales between the respective collected indoor unit data. In order to convert the plurality of data into a single data, input values (x) of the plurality of field data are normalized by min-max scaling (Equation 1).

$$x' = \frac{x - \min(x)}{\max(x) - \min(x)} \quad <\text{Equation 1}>$$

In the cluster matching operation (S120), the indoor space may be matched to one of the plurality of clusters, stored in the cluster classification data 66, based on the collected indoor unit data.

The cluster matching operation (S120) may be performed based on proximity between the plurality of clusters, included in the cluster classification data 66, and the collected indoor unit data. In one embodiment, data calculated by the Manhattan Distance may be matched to the clusters stored in the cluster classification data 66.

$$d(x, y) = \sum_{i=1}^{n} |x_i - y_i| \quad <\text{Equation 2}>$$

When the indoor units are not OFF, the operation of collecting the indoor unit data at preset time intervals and matching the data to clusters may be repeated. By measuring the indoor unit data at the preset time intervals, changes in the clusters of the indoor space may be identified. The preset time intervals may be equal time intervals.

Accordingly, when a set time period elapses (S140) while the indoor units are not in operation, the indoor unit data may be re-collected.

When the indoor units are OFF (S130), the clusters may be corrected based on the changes in clusters during an operating time of the indoor units (S150).

Here, the operating time of the indoor units may refer to a time period from when the indoor units are ON to when the indoor units are OFF.

In the operation of correcting the clusters (S150), the matched clusters are collected at the preset time intervals during the operating time of the indoor units, and when the third cluster level to the fifth cluster level make up half or more of the collected cluster data, the operation of correcting the clusters may be performed to raise the cluster level.

During the operating time of the indoor units, the temperature of the indoor space may be changed to a level close to the set temperature. That is, as the indoor units are operated, the clusters of the indoor space may be changed such that the load required for the indoor unit may be reduced.

During the operating time of the indoor units, the cluster level matched to the indoor unit data may be changed to a lower level. During the operating time of the indoor units, the field data are collected a plurality of times, and the cluster values calculated a plurality of times may be derived.

Accordingly, if the first cluster level and the second cluster level make up half or less of the matched cluster data determined during the operating time of the indoor units, the cluster level may be corrected to a higher level. If the third cluster level to the fifth cluster level make up a greater percentage of the data during the operating time of the indoor units, a user feels discomfort for a long period of time, such that it may be determined that a user's degree of comfort is not increased rapidly even by the operation of the indoor units. Accordingly, by raising the overall cluster level, the degree of comfort in the indoor space may be satisfied rapidly.

The clusters measured a plurality of times during the operating time of the indoor units may have a high percentage of data that converge on the set temperature. Accordingly, the calculated cluster values measured during the operating time of the indoor units may have a high percentage of the first cluster level and the second cluster level.

In the operation of correcting the clusters (S150), an initial cluster value may be corrected. In addition, by reflecting the corrected initial cluster value, an additional cluster value may be corrected. That is, the additional cluster value may have a higher temperature or humidity range than the initial cluster value, or a cluster having a large difference between the indoor temperature and the set temperature may be corrected to a higher level.

In order to increase the accuracy in correcting the clusters (S150), a percentage of the third cluster level LV3 to the fifth cluster level LV5 measured during the duty cycle of the plurality of indoor units may be considered.

Here, the duty cycle of the plurality of indoor units may refer to a time period from a start point when the indoor units are ON to an end point when the indoor units are OFF. The above operating time of the indoor units may refer to an operating time in the duty cycle of the indoor units. Accordingly, the plurality of duty cycles may indicate that the indoor units are on and off a plurality of times.

Data used as the duty cycles of the plurality of indoor units may be duty cycles used at a previous time point before a corresponding operating time point. Accordingly, the duty cycles of the indoor units may include a duty cycle including a last off time and a duty cycle including an off time prior to the last off time.

In addition, the state of the indoor space may be identified more accurately by using currently measured data than previously measured data, such that a weight may be applied to the currently measured data.

Figure 9:
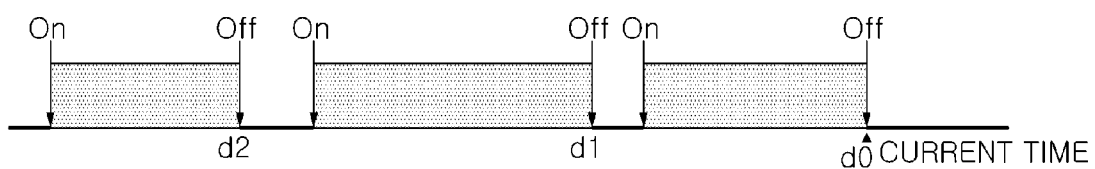
FIG. 9 is a diagram explaining a plurality of duty cycles of indoor units.

Referring to FIG. 9, the operation of the indoor units until the last off time may be defined as a first duty cycle d0, the operation of the indoor units until an off time prior to duty cycle d0 may be defined as a second operating period d1, and the operation of the indoor units until an off time prior to duty cycle d1 may be defined as a third duty cycle d2.

A maximum weight may be applied to a percentage d0 of the third cluster level LV3 to the fifth cluster level LV5 measured during the first duty cycle d0 of the indoor units, and a minimum weight may be applied to a percentage d2 of the third cluster level LV3 to the fifth cluster level LV5 measured during the third duty cycle d2 of the indoor units, and a medium weight may be applied to a percentage d1 of the third cluster level LV3 to the fifth cluster level LV5 measured during the second duty cycle d1 of the indoor units.

That is, by applying the weights as shown in the following <Equation 3>, an indoor state dt during the duty cycles may be obtained.

$$dt = \frac{3 \times d0 + 2 \times d1 + d2}{6} \qquad <\text{Equation 3}>$$

If data used during the duty cycles of the plurality of indoor units increase, an expression of Equation 3 may be changed.

If the indoor state dt during the duty cycles exceeds 0.5, the integrated controller 50 may correct the cluster level to a higher level.

In another example, in the operation of correcting the clusters (S150), cluster matching data may be collected at the preset time intervals during the operating time of the indoor units; and if an average value of the collected cluster matching data is higher than a set reference value, the clusters may also be corrected.

In this case, when a cluster value of the fifth cluster level LV5 which is the highest level is set to 1, and a cluster value of the first cluster level LV1 which is the lowest level is set to 0, and when cluster values therebetween are uniformly distributed, a setting reference value may be set to 0.5.

If an average value of the clusters is greater than 0.5 as the setting reference value, the initial cluster level may be corrected. By calculating an average value of the cluster data matched a plurality of times during the operating time of the indoor units, and if the calculated average value of the clusters is greater than the setting reference value, the initial cluster may be corrected.

In the above manner, the integrated controller 50 may calculate and correct the clusters for the respective indoor spaces in which the plurality of indoor units 30a, 30b, and 30c are installed.

<Overall Control>

Figure 10:
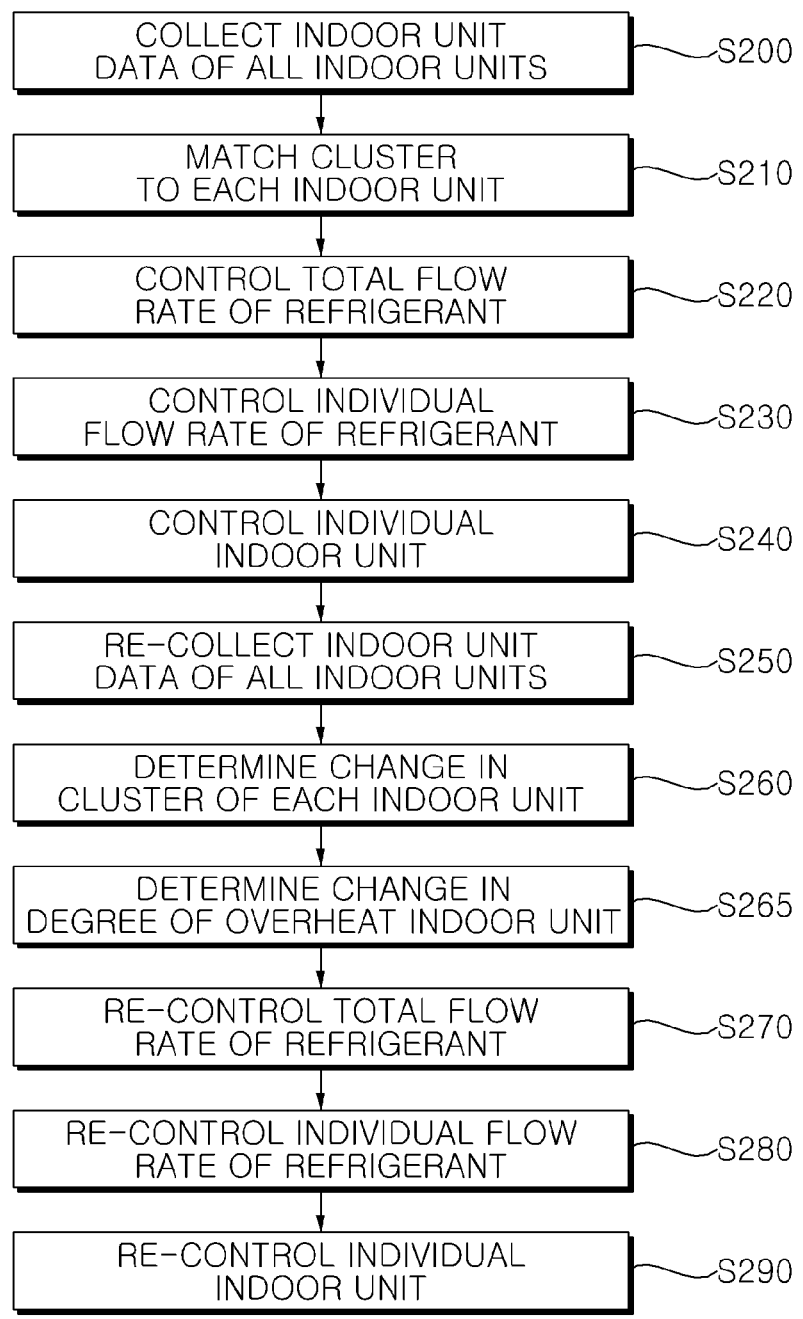
FIG. 10 is a flowchart explaining a method of providing overall control of a plurality of indoor units connected to an outdoor unit.

Hereinafter, a method of controlling an air conditioner will be described with reference to FIG. 10, in which the air conditioner may collect indoor unit data of all the indoor units, and may control the indoor expansion valve 36, disposed in the respective indoor units 30a, 30b, and 30c, by considering a total load of all the indoor units and individual loads of the respective indoor units.

First, indoor unit data of all the indoor units 30a, 30b, and 30c are collected (S200).

The indoor unit data of all the indoor units 30a, 30b, and 30c may include the number of indoor units, which are currently in operation, among the plurality of indoor units connected to the outdoor unit 10, and the temperature, humidity, and set temperature of the indoor space in which the indoor units are installed. Further, the indoor unit data may include information on the number of persons present in the indoor space where the indoor units are installed. The indoor unit controller 40 may transmit information on the number of persons present in the indoor space, which is sensed by the camera 45, to the integrated controller 50.

Based on the indoor unit data of the indoor units in operation, the integrated controller 50 may match clusters to each of the indoor units (S210). Accordingly, the integrated controller 50 may identify the number of indoor units in operation, and the clusters of the indoor space where the indoor units in operation are installed.

Then, a total flow rate of the refrigerant supplied to the plurality of indoor units 30a, 30b, and 30c may be regulated (S220). The integrated controller 50 may determine a total load required for all the indoor units 30a, 30b, and 30c based on the indoor unit data of all the indoor units 30a, 30b, and 30c. The total flow rate of the refrigerant supplied to the plurality of indoor units may be regulated based on the total load determined by the integrated controller 50 and required for all the indoor units 30a, 30b, and 30c.

By controlling the operation of the compressor 12, the outdoor unit controller 20 may regulate the total flow rate of the refrigerant supplied to the plurality of indoor units. That is, based on the required total load, the outdoor unit controller 20 may regulate the amount of refrigerant discharged from the compressor 12.

In addition, an individual flow rate of the refrigerant supplied to the respective indoor units 30a, 30b, and 30c may be regulated (S230).

The operation (S230) of regulating the individual flow rate of the refrigerant may be performed by controlling the indoor expansion valve 36, disposed in the respective indoor units, according to the clusters of the respective indoor units which are determined by the integrated controller 50.

The operation (S230) of regulating the individual flow rate of the refrigerant may be performed by controlling the indoor expansion valve 36 to increase the amount of refrigerant flowing to an indoor unit having a high cluster level, and to decrease the amount of refrigerant flowing to an indoor unit having a low cluster level.

For example, in the case where a first indoor unit is determined to have a fourth cluster level, and a second indoor unit is determined to have a second cluster level, the indoor expansion valve 36 of the first indoor unit may be controlled to increase the amount of the refrigerant flowing to the first indoor unit disposed in the first indoor space.

In addition, the individual indoor units may be controlled (S240). The operation of controlling the individual indoor units may be performed by controlling the operation of the indoor unit fan 32 and the vanes 38 according to the clusters of spaces in which the respective indoor units are installed.

Then, when a set period of time elapses, indoor unit data of all the indoor units 30a, 30b, and 30c may be re-collected (S250). In the operation of collecting the indoor unit data, previous indoor unit data may be collected, and then the indoor unit data may be collected at preset time intervals.

The re-collected indoor unit data of all the indoor units 30a, 30b, and 30c may include the number of indoor units currently in operation, information on the temperature, humidity, and set temperature of the indoor space in which the indoor units in operation are installed, and information on the number of persons in the indoor space.

Based on the indoor unit data of all the indoor units 30a, 30b, and 30c, the integrated controller 50 may identify the clusters of the indoor space at a corresponding time and information on the number of persons in the indoor space at the corresponding time.

By comparing indoor unit data before the set time period of the corresponding time point with indoor unit data at the corresponding time point, the integrated controller 50 may determine whether the clusters of the respective indoor units are changed (S260). That is, the integrated controller 50 may determine the change in cluster levels before and after the set time period.

By comparing the indoor unit data before the set time period of the corresponding time point with indoor unit data at the corresponding time point, the integrated controller 50 may identify a change in a degree of overheat of the respective indoor units (S265).

Here, the change in the degree of overheat may refer to an amount of heat which is further required or is reduced according to the number of persons present in the indoor space.

The integrated controller 50 may determine the change in the degree of overheat of the indoor units by determining a change in the number of persons in the indoor space before and after the set time period.

Referring to FIG. 11, the change in the degree of overheat may be determined based on the change in the number of persons. The degree of overheat may vary according to the number of persons. Referring to FIG. 11, A0 denotes a maximum degree of required overheat, and A4 denotes a minimum degree of required overheat.

Referring to FIG. 11, as the cluster level increases or as the number of persons in the indoor space increases, the degree of overheat may increase.

Referring to FIG. 11, even at the same cluster level, the degree of overheat may vary according to an increase or decrease in the number of persons. In addition, referring to FIG. 11, as the cluster level decreases, a target degree of overheat may be easily changed according to a change in the number of persons.

Then, a total flow rate of refrigerant supplied to the plurality of indoor units may be re-controlled (S270). Based on the re-collected indoor unit data, the operation of the compressor 12 disposed in the outdoor unit 10 may be controlled according to an increase or decrease in the total load of the plurality of indoor units.

In addition, the individual flow rate of refrigerant supplied to the respective indoor units may be re-controlled (S280).

The operation (S280) of re-controlling the individual flow rate of refrigerant may be performed based on change in the clusters of the respective indoor units and a change in the degree of overheat.

That is, the integrated controller 50 may transmit the change in the clusters of the respective indoor units and the change in the degree of overheat to each indoor unit controller 40, and each indoor unit controller 40 may control the indoor expansion valve 36.

That is, if the degree of overheat is changed such that the number of persons increases or if the cluster levels of the indoor space increase, the indoor unit controller 40 may increase an opening degree of the indoor expansion valve 36. By contrast, if the degree of overheat is changed such that the number of persons decreases or if the cluster levels of the indoor space decrease, the indoor unit controller 40 may decrease an opening degree of the indoor expansion valve 36.

Further, when the cluster levels of the indoor space are changed or when the degree of overheat is changed, the indoor unit controller 40 may re-control the individual indoor units (S290). The operation (S290) of re-controlling the individual indoor units may be performed by controlling the operation of the indoor fan 32 and the vanes 38.

<Controlling Individual Indoor Units>

Figure 12:
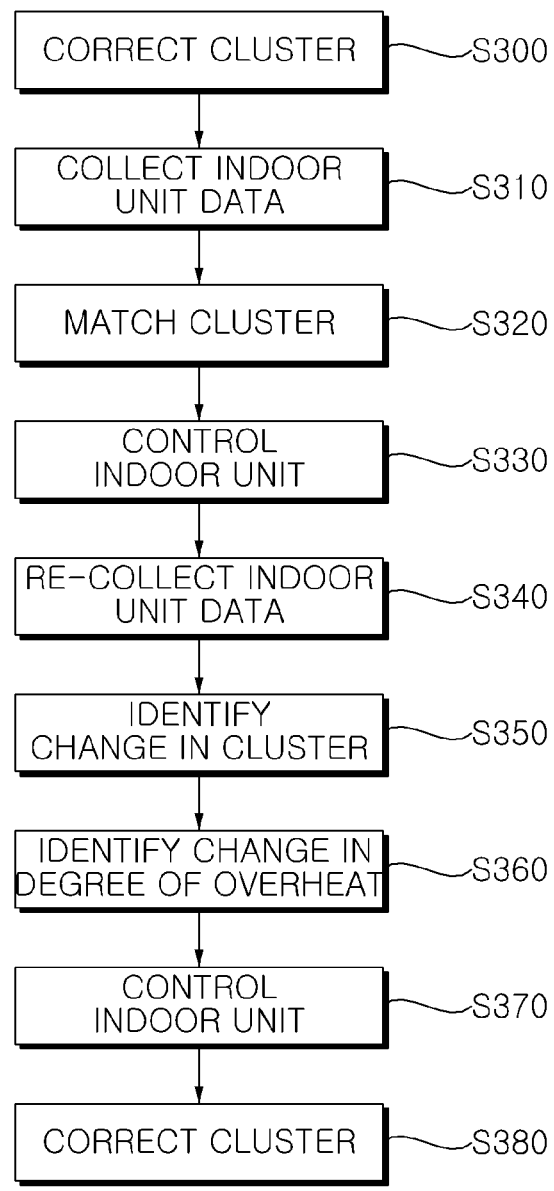
FIG. 12 is a flowchart illustrating a method of controlling individual indoor units.

Referring to FIG. 12, an example of correcting clusters of individual indoor units and controlling the indoor units according to a change in a degree of overheat will be described below.

First, clusters may be corrected based on cluster levels determined a plurality of times during the operating time of the indoor units (S300). The operation of correcting the clusters (S300) may be performed based on data information on previous duty cycles of indoor units which are off.

Figure 8:
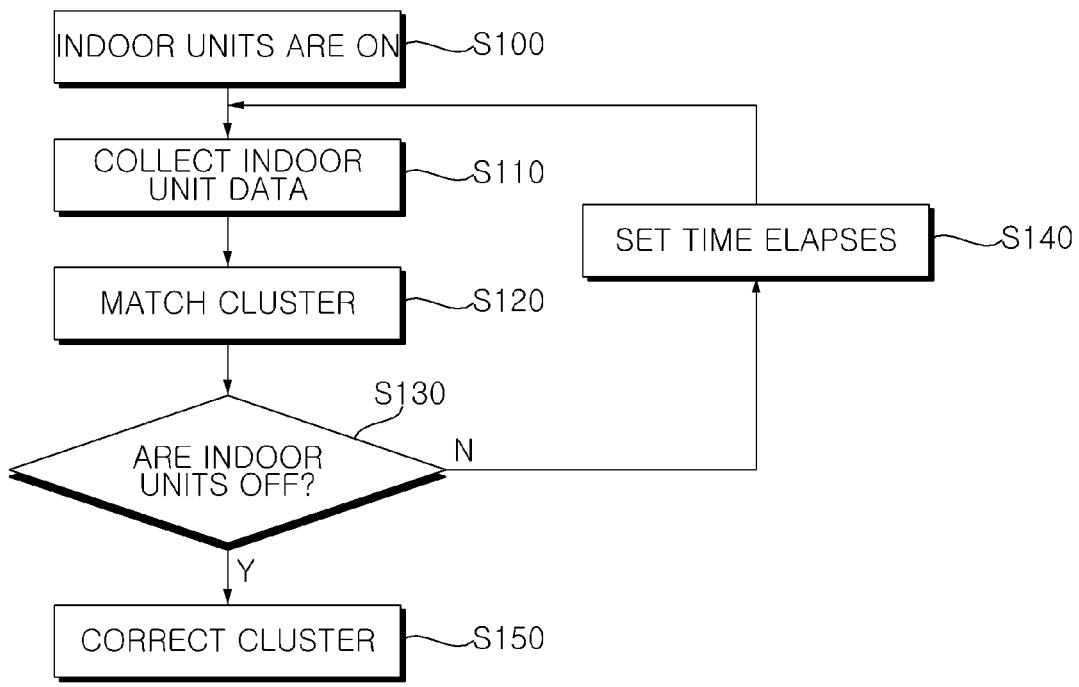
FIG. 8 is a flowchart explaining a process of correcting clusters.

The operation of correcting the clusters (S300) may be performed in the same manner as FIG. 8.

Subsequently, indoor unit data are collected by the indoor sensing unit 42 and the input unit 48 (S310). The indoor unit data may include indoor temperature, indoor humidity, and set temperature. In addition, the indoor unit data may include information on the number of persons present in the indoor space where the indoor units are installed.

The indoor space may be matched to the clusters based on the indoor unit data (S320). By matching of the indoor space to the clusters, cluster levels of the indoor space, in which the indoor units are installed, may be determined.

The indoor units may be controlled based on the matched clusters (S330). That is, based on the cluster levels, the rotational speed of the indoor unit fan 32 or the arrangement of the vanes 38 may be controlled.

The operation of controlling the indoor units (S330) may include controlling an airflow based on the matched clusters (S420 and S430, see FIG. 13) or performing follow-up control (S510 to S550, see FIG. 15) to maintain the indoor space in a comfortable state.

Then, when a set period of time elapses, the indoor unit data may be re-collected (S340). The indoor unit data re-collected from the indoor units may include information on the temperature, humidity, and set temperature of the indoor space, and information on the number of persons in the indoor space.

Based on the indoor unit data, the integrated controller 50 may identify the clusters of the indoor space at a corresponding time and the information on the number of persons in the indoor space at the corresponding time.

The integrated controller 50 may determine whether the clusters of the indoor space are changed before and after the set time period (S350). That is, the integrated controller 50 may determine whether the cluster levels are changed before and after the set time period.

By determining a change in the number of persons present in the indoor space before and after the set time period, the integrated controller 50 may determine whether a degree of overheat of the indoor units is changed (S360).

Upon determining the change in the cluster levels or in the degree of overheat, the integrated controller 50 may transmit information on the change in the degree of overheat to the indoor unit controller 40. The indoor unit controller 40 may control the operation of the indoor units (S370) based on the information on the change in the cluster levels or in the degree of overheat, which is transmitted from the integrated controller 50.

Specifically, the indoor unit controller 40 may control an amount of refrigerant flowing into the indoor units by controlling the indoor expansion valve 36 or may change the RPM of the indoor unit fan 32 or the arrangement of the vanes 38.

Next, at a time when the indoor units are off, the clusters may be corrected based on the change in the clusters during the operating time of the indoor units (S380).

<Controlling Airflow of Indoor Units>

Figure 13:
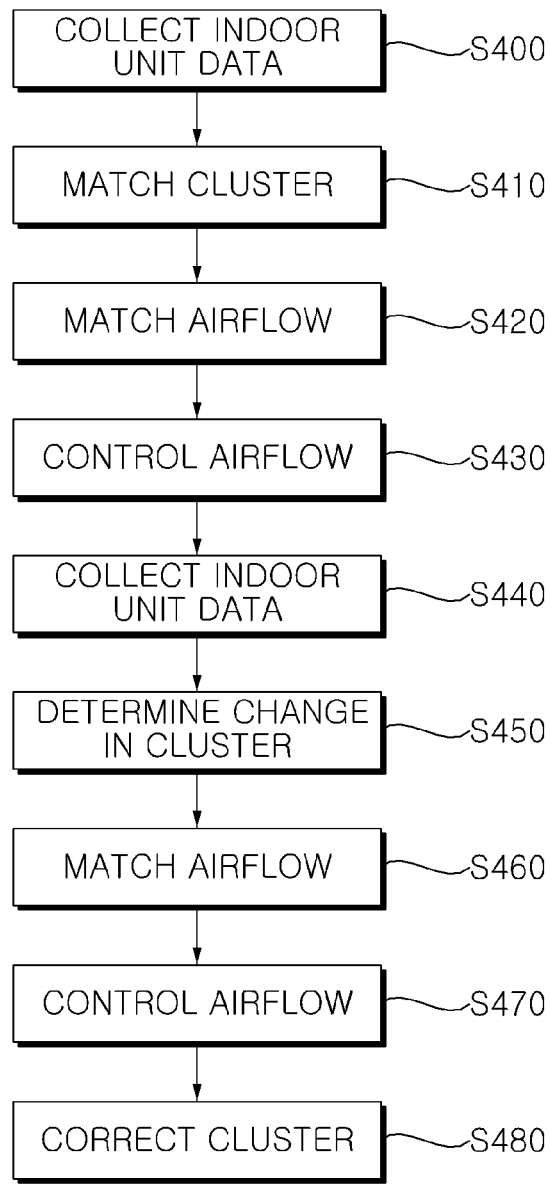
FIG. 13 is a flowchart explaining a method of controlling an airflow for each cluster of an indoor space.

Hereinafter, a method of controlling an airflow based on the clusters of the indoor space will be described with reference to FIG. 13.

Indoor unit data are collected (S400).

The indoor units may collect information on indoor temperature sensed by the indoor temperature sensor 44, indoor humidity sensed by the indoor humidity sensor 46, and set temperature input through the input unit 48. The indoor unit controller 40 may transmit the information on the indoor temperature, indoor humidity, and set temperature to the integrated controller 50.

The integrated controller 50 may match the indoor space to one of a plurality of clusters (S410) based on the indoor unit data. The integrated controller 50 may match the indoor space to the clusters based on proximity between the plurality of clusters, included in the cluster classification data 66, and the collected indoor unit data.

The integrated controller 50 may match an airflow to corresponding clusters based on the cluster classification data 66 and the airflow classification data 68, which are stored in the storage 60.

The airflow classification data 68 may include airflow data classified according to the cluster levels. In addition, the airflow classification data 68 may include airflow data classified based on the presence of a human body. Further, the airflow classification data 68 may include airflow data classified based on the presence of a floor temperature sensor for sensing the temperature of a floor.

A flow of air discharged through the outlet may be controlled based on the airflow classification data 68 (S430).

The flow of air discharged through the outlet of the indoor units may be controlled differently according to the cluster levels.

Referring to FIGS. 14A and 14B, tables are shown in which an airflow varies according to the cluster levels in a cooling mode or a heating mode. The tables are merely examples, and the cluster levels or airflow modes may be further subdivided.

Referring to FIG. 14A, it can be seen that in the cooling mode, as the cluster levels increase, the environment is hot or humid. Accordingly, the indoor unit controller 40 may control the operation of the vanes 38 or the indoor unit fan 32 according to the cluster levels. That is, the indoor unit controller 40 may vary the rotational speed of the indoor unit fan 32 according to a degree of hotness. In addition, according to a degree of humidity, the indoor unit controller 40 may further perform a dehumidifying operation. During the dehumidifying operation, the indoor unit controller 40 may reduce the rotational speed of the indoor unit fan 32, and may increase the amount of a flowing refrigerant by controlling the indoor expansion valve 36.

In addition, except the fifth cluster level, the indoor unit controller 40 may place the vanes 38 in a position to generate an indirect airflow so that the air discharged through the outlet of the indoor units may not flow directly toward occupants.

However, in a high cluster level environment, if there is no occupant, the indoor unit controller 40 may rapidly cool the indoor space by operating the vanes 38 in an auto swing mode in which the arrangement of the vanes 38 is continuously changed.

Referring to FIG. 14B, it can be seen that in the heating mode, as the cluster level increases, the environment is cold or dry. Accordingly, the indoor unit controller 40 may control the operation of the values 38 or the indoor unit fan 32 according to the cluster levels. That is, the indoor unit controller 40 may vary the rotational speed of the indoor unit fan 32 according to a degree of coldness.

If the indoor temperature is very low, the indoor unit controller 40 may inform a user that it is required to separately perform humidification.

The indoor unit controller 40 may place the vanes 38 in a position to generate an indirect airflow so that the air discharged through the outlet of the indoor units may not flow directly toward occupants. However, if there is no camera 45 and the like such that it is difficult to sense the presence of a human body, the indoor unit controller 40 may place the vanes 38 in a position for an auto adjusting air mode.

In the auto adjusting air mode, the vanes 38 may be placed in a fixed position so that the air discharged through the output may be discharged in one direction, or the vanes 38 may be continuously changed as in the auto swing mode. In the auto adjusting air mode, the arrangement of the vanes 38 may be continuously changed based on a difference between the temperature of the indoor space or the set temperature. That is, if a difference between the indoor temperature and the set temperature is large as in the case of the fourth cluster level or the fifth cluster level, the vanes 38 may be placed in a position to allow the air, discharged through the outlet, to be discharged from the bottom. In addition, if a difference between the indoor temperature and the set temperature is small as in the case of the first cluster level or the second cluster level, the vanes 38 may be placed in a position to allow the air, discharged through the outlet, to be discharged in a direction parallel to the ceiling.

The airflow control function may be activated during a set time period after the indoor unit data are collected. Accordingly, when the set time period elapses, the airflow may be controlled in an airflow mode set by a user.

Next, the indoor unit data are collected periodically (S440), and a change in clusters matched to the indoor unit data may be determined (S450), followed by airflow matching (S460) to perform an airflow control function (S470).

Subsequently, at a time when the operation of the indoor units is finished, the clusters may be corrected based on the change in the clusters during the operating time of the indoor units (S480).

<Comfort Temperature Control>

Figure 15:
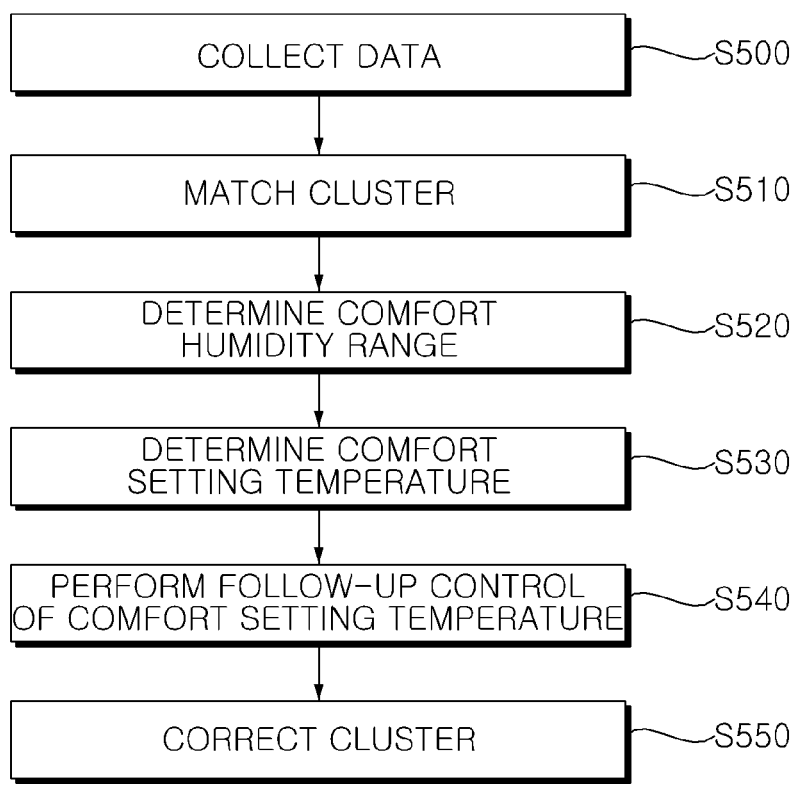
FIG. 15 is a flowchart illustrating a method of controlling comfort of an indoor space according to an embodiment of the present disclosure.

Hereinafter, a method of controlling an air conditioner to maintain the indoor space in a comfortable condition will be described with reference to FIG. 15. A comfort air function may be a method of calculating comfort temperature of the indoor space based on temperature and humidity data of the indoor space and controlling an airflow.

First, data are collected by the indoor sensing unit 42 and the input unit 48 (S500). The temperature and humidity of the indoor space may be sensed by the indoor temperature sensor 44 and the indoor humidity sensor 46. Further, the set temperature input to the input unit 48 by a user may be identified. In the case where there is no indoor humidity sensor 46, the indoor humidity may be estimated using the outdoor humidity sensor 26 and the outdoor temperature sensor 24.

The indoor space may be matched to one of the plurality of clusters based on the indoor unit data (S510). The integrated controller 50 may match the indoor unit data to one of the plurality of clusters included in the cluster classification data 66.

Then, a comfort humidity range is determined (S520). The comfort humidity range may be determined based on the predicted mean vote (PMV) data stored in the storage 60.

The operation of determining the comfort humidity range (S520) may be performed based on the predicted mean vote (PMV) data. That is, a humidity range, corresponding to a range of set predicted mean vote (PMV) values, may be identified based on the set temperature. Here, the range of the set PMV values may be determined based on a degree of comfort of a user. In one embodiment, a comfort humidity range, corresponding to the PMV values ranging from −1 to 1, may be determined (−1<PMV<1).

Referring to FIG. 16, a range of temperature and humidity values, corresponding to the PMV values ranging from −1 to 1, may be identified in a cooling mode. In one embodiment, when the set temperature is 25° C., humidity values corresponding to the PMV values ranging from −1 to 1 may be in a range of 59 to 80. In this manner, the comfort humidity range may be determined based on the set temperature.

Next, a comfort setting temperature is determined (S530), and the indoor units are controlled to perform follow-up control of the comfort setting temperature (S540).

The comfort setting temperature may be determined based on whether the indoor humidity falls within the comfort humidity range. It may be determined whether the current humidity falls within the comfort humidity range based on the PMV data. In addition, based on indoor temperature, indoor humidity, and set temperature in a current condition, which are collected as the indoor unit data, the indoor humidity when the set temperature is reached may be predicted, and it may be determined whether the predicted indoor humidity falls within the comfort humidity range.

If the indoor humidity falls within the comfort humidity range, the set temperature may be determined to be the comfort setting temperature.

If the indoor humidity falls outside the comfort humidity range, a temperature value, corresponding to the range of the set PMV values at the indoor humidity, may be determined to be the comfort setting temperature. The range of the set PMV values may be a range of from −1 to 1.

The comfort setting temperature may be set within a range in which a temperature difference from an existing set temperature does not exceed an additional set temperature range. That is, if a temperature difference between a temperature value, corresponding to the range of the set PMV values at the indoor humidity, and the existing set temperature is within the additional set temperature range, the temperature value corresponding to the range of the set PMV values at the indoor humidity may be determined to be the comfort setting temperature. The additional set temperature range may vary according to the size of the indoor space or the set temperature. In one embodiment, the additional set temperature range may also be set in a range of 2° C. to 4° C.

However, if the difference between the temperature, corresponding to the range of the set PMV values at the indoor humidity, and the existing set temperature exceeds the additional set temperature range, a value obtained by correcting the existing set temperature with a maximum value in the additional set temperature range may be determined to be the comfort setting temperature.

Here, in the correcting of the existing set temperature with the additional set temperature, a value may be obtained by adding or subtracting the maximum value in the additional set temperature range to or from the existing set temperature. That is, the maximum value in the additional set temperature may be added to or subtracted from the existing set temperature, so as to obtain a value close to the temperature corresponding to the range of the set PMV values at the indoor humidity.

Then, at a time when the indoor units are off, the clusters may be corrected based on changes in the clusters during the operating time of the indoor units (S550).

It is an object of the present disclosure to provide a method of controlling an air conditioner capable of controlling an indoor space to rapidly reach a comfortable state.

It is another object of the present disclosure to provide a method of controlling an air conditioner capable of adapting to the environment on site and controlling the indoor space to rapidly reach a comfortable state.

It is yet another object of the present disclosure to provide a method of controlling an air conditioner capable of customizing control of the indoor space in response to a state of the indoor space and a change in the state, thereby enhancing a user's comfort.

It is still another object of the present disclosure to provide a method of controlling an air conditioner capable of maintaining or changing follow-up temperature of an indoor unit based on predicted mean vote (PMV) that affects users.

The objects of the present disclosure are not limited to the aforementioned objects and other objects not described herein will be clearly understood by those skilled in the art from the following description.

In accordance with an aspect of the present disclosure, the above and other objects can be accomplished by providing a method of controlling an air conditioner, the method including: collecting indoor unit data during a time period from when an indoor unit is ON to when the indoor unit is OFF; and correcting clusters based on changes in the clusters which are matched based on the collected data, thereby accurately determining a state of an indoor space by changing the plurality of clusters according to an environment on site.

The method of controlling the air conditioner according to an embodiment of the present disclosure may include collecting indoor unit data. The method of controlling the air conditioner may include matching the collected indoor unit data to one of a plurality of clusters stored in a storage. The method of controlling the air conditioner may include re-collecting the indoor unit data at preset time intervals, and matching the indoor unit data to corresponding clusters. The method of controlling the air conditioner may include correcting the clusters based on changes in the clusters matched during an operating time of the indoor unit.

The plurality of clusters may be classified into a plurality of cluster levels based on a load required for the indoor unit, wherein the correcting of the clusters may include, in response to a number of clusters, having a level greater than or equal to a preset level and counted during an operating time of the indoor unit, being greater than a preset percentage of a total number of the counted clusters, correcting the measured cluster levels to increase by one level, thereby controlling the indoor unit to operate according to an operation environment of the indoor unit and an indoor environment.

The plurality of clusters may be classified into a plurality of cluster levels based on a load required for the indoor unit, wherein the correcting of the clusters may include, in response to an average value of the cluster levels, identified at preset time intervals during an operating time of the indoor unit, being greater than a preset reference value, correcting the clusters to increase in level, thereby controlling the indoor unit to operate according to an operation environment of the indoor unit and an indoor environment. The indoor unit may be ON and OFF during a plurality of duty cycles, wherein the correcting of the clusters may include correcting the clusters based on changes in the clusters during the plurality of duty cycles, thereby accurately determining a state of an indoor space.

The correcting of the clusters may include applying a weight to a duty cycle including a last OFF time, among the plurality of duty cycles, thereby controlling an operation in consideration of a recent indoor state and the state of the indoor unit.

The correcting of the clusters may include correcting the clusters determined during the operating time, thereby correcting the whole clusters.

The matching of the collected indoor unit data to one of a plurality of clusters may include matching of the collected indoor unit data to one of a plurality of clusters based on proximity between the plurality of clusters, included in the storage, and the collected indoor unit data, thereby classifying the state of the indoor space.

The indoor unit data may include indoor temperature, indoor humidity, and a number of occupants, which are sensed by an indoor sensing unit, and set temperature input by a user, wherein the indoor unit data are processed so that calculated degrees of influence between collected data factors are adjusted to a similar level, such that a plurality of factors may be reflected equally.

The matching of the collected indoor unit data to one of a plurality of clusters may be followed by controlling the indoor unit based on a cluster matching result, thereby controlling the indoor space based on the state of the indoor space.

The method of controlling the air conditioner may further include re-collecting the indoor unit data at the preset time intervals, matching the re-collected indoor unit data to corresponding clusters, and re-controlling the indoor unit by determining a change in the clusters, thereby operating the indoor unit according to an environment of the indoor space which changes over time.

The indoor unit data may include indoor temperature sensed by an indoor temperature sensor, indoor humidity sensed by an indoor humidity sensor, a number of occupants which is sensed by a camera, and set temperature input by a user, wherein the re-collecting of the indoor unit data may be followed by determining a change in a degree of overheat based on a change in a number of persons present in an indoor space, and controlling the indoor unit based on the degree of overheat, thereby controlling the indoor space in consideration of the change in the number of occupants.

The controlling of the indoor unit may include controlling a rotational speed of an indoor unit fan and arrangement of vanes based on the matched clusters, thereby controlling a volume and speed of air, discharged through an outlet, according to the state of the indoor space.

The controlling of the indoor unit may include: based on cluster classification data and airflow classification data which are stored in a storage, matching airflows to corresponding clusters; and controlling an airflow, discharged through the outlet, based on the matched airflows, thereby controlling the indoor space by matching the airflow to each corresponding cluster.

The indoor unit data may include indoor temperature sensed by an indoor temperature sensor, indoor humidity sensed by an indoor humidity sensor, and set temperature input by a user. The controlling of the indoor units may include determining a comfort humidity range based on the set temperature and predicted mean vote (PMV) data. The controlling of the indoor units may include determining a comfort setting temperature by comparing the indoor humidity and the comfort humidity range at the set temperature. The controlling of the indoor units may include controlling the indoor units to perform follow-up control of the comfort setting temperature. The controlling of the indoor units may include controlling the indoor space to be maintained in a comfortable state.

The comfort humidity range may be set to a humidity range, corresponding to a setting value range of the PMV at the set temperature, based on the PMV data, thereby controlling the temperature within a range of PMV in which a user feels comfort.

The setting value range of the PMV may be from −1 to 1, thereby controlling the temperature within a range of PMV in which a user feels comfort.

The method of controlling the air conditioner may further include, in response to the indoor humidity at the set temperature falling within the comfort humidity range, determining the set temperature as the comfort setting temperature, thereby controlling the temperature within a range of PMV in which a user feels comfort.

The method of controlling the air conditioner may further include, in response to the indoor humidity falling outside the comfort humidity range, determining temperature, corresponding to the setting value range of the PMV at the indoor humidity, as the comfort setting temperature, thereby controlling the temperature within a range of PMV in which a user feels comfort.

The method of controlling the air conditioner may further include, in response to the temperature, corresponding to the setting value range of the PMV at the indoor humidity, exceeding an additional set temperature range, determining a value, obtained by correcting a maximum value in the additional set temperature range, as the comfort setting temperature, thereby controlling the temperature within a range of PMV in which a user feels comfort.

Other detailed matters of the exemplary embodiments are included in the detailed description and the drawings.

The method of controlling an air conditioner according to the present disclosure has one or more of the following effects.

First, by identifying a state of an indoor space and by controlling an operation based on the state, the air conditioner may improve comfort of the indoor space.

Second, by correcting clusters of a state of the indoor space and a state of the indoor unit based on changes in the clusters, the air conditioner may adapt to the environment on site and may rapidly increase comfort of the indoor space.

Third, by identifying a change in a degree of overheat based on a change in the number of persons in the indoor space, the air conditioner may rapidly respond to a state change of the indoor space, thereby rapidly controlling the indoor space.

Fourth, by controlling the indoor space based on temperature set by a user and predicted mean vote (PMV) of the indoor space, the indoor space may be maintained at an optimal temperature.

The effects of the present disclosure are not limited to the aforesaid, and other effects not described herein will be clearly understood by those skilled in the art from the following description of the appended claims.

While the present disclosure has been particularly shown and described with reference to preferred embodiments thereof, it will be understood by those skilled in the art that the present disclosure is not limited to those exemplary embodiments and various changes in form and details may be made therein without departing from the scope and spirit of the invention as defined by the appended claims and should not be individually understood from the technical spirit or prospect of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling an air conditioner through processing of clusters of indoor unit data, the method comprising:

operating an indoor unit by generating control signals for a fan and an expansion valve based on initial environment data collected by an indoor sensing unit;

collecting indoor unit data, including at least temperature, humidity, and occupancy information, via the indoor sensing unit comprising one or more sensors;

matching, by a controller, the collected indoor unit data to one of a plurality of clusters stored in a storage, each cluster being associated with control parameter data used for operating the indoor unit;

re-collecting the indoor unit data at preset time intervals during an operating time of the indoor unit, and matching, by the controller, the re-collected indoor unit data to corresponding clusters;

controlling the indoor unit to be turned off after completion of an operating cycle;

analyzing, by the controller, variations in the clusters matched during the operating time of the indoor unit, and adjusting control parameter data associated with the clusters based on the analysis, wherein the adjusted parameters are stored in memory and used for updating control profiles corresponding to the clusters, wherein the plurality of clusters are classified into a plurality of cluster levels based on a load required for the indoor unit, and wherein the correcting of the clusters comprises, in response to a number of clusters, having a level greater than or equal to a preset level and counted during an operating time of the indoor unit, being greater than a preset percentage of a total number of the counted clusters, correcting the measured cluster levels to increase by one level; and operating the indoor unit based on the adjusted control parameter data.

2. The method of claim 1, wherein the plurality of clusters are classified into a plurality of cluster levels based on a load required for the indoor unit, and wherein the correcting of the clusters comprises, in response to an average value of the cluster levels, identified at preset time intervals during the operating time of the indoor unit, being greater than a preset reference value, correcting the clusters to increase in level.

3. The method of claim 1, wherein the indoor unit is turned ON and OFF during a plurality of duty cycles, and wherein the correcting of the clusters comprises correcting the clusters based on changes in the clusters during the plurality of duty cycles.

4. The method of claim 3, wherein the correcting of the clusters comprises applying a weight to a duty cycle including a last OFF time, among the plurality of duty cycles.

5. The method of claim 1, wherein the correcting of the clusters comprises correcting the clusters determined during the operating time.

6. The method of claim 1, wherein the matching of the collected indoor unit data to one of a plurality of clusters comprises matching of the collected indoor unit data to one of a plurality of clusters based on proximity between the plurality of clusters, included in the storage, and the collected indoor unit data.

7. The method of claim 1, wherein the indoor unit data comprise indoor temperature, indoor humidity, and a number of occupants, which are sensed by the indoor sensing unit, and a set temperature input by a user.

8. The method of claim 1, wherein the matching of the collected indoor unit data to one of a plurality of clusters is followed by controlling the indoor unit based on a cluster matching result.

9. The method of claim 8, further comprising re-collecting the indoor unit data at the preset time intervals via the indoor sensing unit;

matching the re-collected indoor unit data to corresponding clusters by the controller;

determining, by the controller, whether a change has occurred in the matched cluster by comparing the re-collected cluster with a previously matched cluster; and generating, by the controller, a control signal to adjust at least one of a fan speed or an opening degree of the expansion valve of the indoor unit based on the change in cluster assignment.

10. The method of claim 8, wherein the controlling of the indoor unit comprises generating, by the controller, a control signal to adjust a rotational speed of the fan and arrangement of vanes based on the matched clusters.

11. The method of claim 8, wherein the controlling of the indoor unit comprises:

based on cluster classification data and airflow classification data which are stored in a storage, matching airflows to corresponding clusters by the controller; and generating a control signal to control an airflow, discharged through an outlet, based on the matched airflows.

12. The method of claim 8, wherein the indoor unit data comprise an indoor temperature sensed by an indoor temperature sensor of the indoor sensing unit, an indoor humidity sensed by an indoor humidity sensor of the indoor sensing unit, and a set temperature input by a user, wherein the controlling of the indoor units comprises:

determining, by the controller, a comfort humidity range based on the set temperature and predicted mean vote (PMV) data;

determining, by the controller, a comfort setting temperature by comparing the indoor humidity and the comfort humidity range at the set temperature; and generating a control signal to adjust at least one of a fan speed or cooling/heating output of the indoor unit to follow the comfort setting temperature.

13. The method of claim 12, wherein the comfort humidity range is set to a humidity range by the controller, corresponding to a setting value range of the PMV at the set temperature, based on the PMV data.

14. The method of claim 13, wherein the setting value range of the PMV is from $-1$ to $1$ and is used by the controller to determine the comfort humidity range.

15. The method of claim 13 wherein, when the indoor humidity at the set temperature falls within the comfort humidity range the controller determines the set temperature as the comfort setting temperature and generates a control signal to control the indoor unit based on the comfort setting temperature.

16. The method of claim 13 wherein, when the indoor humidity falls outside the comfort humidity range the controller determines, as the comfort setting temperature, a temperature at which the predicted mean vote (PMV) at the indoor humidity falls within a predefined setting value range and generates a control signal to control the indoor unit based on the comfort setting temperature.

17. The method of claim 16 wherein, when the temperature at which the predicted mean vote (PMV) at the indoor humidity falls within a predefined setting value range exceeds an additional set temperature range as defined at the set temperature, the controller determines, as the comfort setting temperature, a value obtained by correcting a maximum value in the additional set temperature range.

18. The method of claim 1, wherein the indoor unit data comprise an indoor temperature sensed by an indoor temperature sensor of the indoor sensing unit, an indoor humidity sensed by an indoor humidity sensor of the indoor sensing unit, a number of occupants, which is sensed by a camera, and a set temperature input by a user, and wherein, after the re-collecting of the indoor unit data, the controller determines whether overheating is occurring by analyzing a correlation between the change in the number of occupants and the rate of change in the indoor temperature, and generates a control signal to adjust at least one of a fan speed or an opening degree of the expansion valve of the indoor unit based on the determination.

19. A method of controlling an air conditioner through processing of clusters of indoor unit data, the method comprising:

operating an indoor unit by generating control signals for a fan and an expansion valve based on initial environment data collected by an indoor sensing unit; collecting indoor unit data, including at least temperature, humidity, and occupancy information, via the indoor sensing unit comprising one or more sensors; matching, by a controller, the collected indoor unit data to one of a plurality of clusters stored in a storage, each cluster being associated with control parameter data used for operating the indoor unit;

re-collecting the indoor unit data at preset time intervals during an operating time of the indoor unit, and matching, by the controller, the re-collected indoor unit data to corresponding clusters;

controlling the indoor unit to be turned off after completion of an operating cycle;

analyzing, by the controller, variations in the clusters matched during the operating time of the indoor unit, and adjusting control parameter data associated with the clusters based on the analysis, wherein the adjusted parameters are stored in memory and used for updating control profiles corresponding to the clusters, wherein the indoor unit is turned ON and OFF during a plurality of duty cycles, and wherein the correcting of the clusters comprises correcting the clusters based on changes in the clusters during the plurality of duty cycles and includes applying a weight to a duty cycle including a last OFF time, among the plurality of duty cycles; and operating the indoor unit based on the adjusted control parameter data.

\* \* \* \* \*